United States Patent
Zhou et al.

(10) Patent No.: US 11,794,248 B2
(45) Date of Patent: Oct. 24, 2023

(54) MULTI-STAGE GAS ATOMIZATION PREPARATION METHOD OF TITANIUM ALLOY SPHERICAL POWDER FOR 3D PRINTING TECHNOLOGY

(71) Applicant: SHENYANG UNIVERSITY OF TECHNOLOGY, Liaoning (CN)

(72) Inventors: Ge Zhou, Liaoning (CN); Zhipeng Zhang, Liaoning (CN); Haoyu Zhang, Liaoning (CN); Yaqian Chen, Liaoning (CN); Nannan Zhang, Liaoning (CN); Xiaojiao Zuo, Liaoning (CN); Xin Wang, Liaoning (CN); Siqian Zhang, Liaoning (CN); Lijia Chen, Liaoning (CN)

(73) Assignee: SHENYANG UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/100,071

(22) Filed: Jan. 23, 2023

(65) Prior Publication Data
US 2023/0234131 A1 Jul. 27, 2023

(30) Foreign Application Priority Data

Jan. 25, 2022 (CN) .......................... 202210086640.3

(51) Int. Cl.
*B22F 9/08* (2006.01)
*B33Y 70/00* (2020.01)
(Continued)

(52) U.S. Cl.
CPC .............. *B22F 9/082* (2013.01); *B22F 1/065* (2022.01); *B33Y 40/10* (2020.01); *B33Y 70/00* (2014.12);
(Continued)

(58) Field of Classification Search
CPC .................................. B22F 9/082; B22F 9/08
See application file for complete search history.

(56) References Cited

U.S. PATENT DOCUMENTS

| | | | | |
|---|---|---|---|---|
| 5,284,329 A | * | 2/1994 | Hohman | B22F 9/082 75/367 |
| 2016/0318105 A1 | * | 11/2016 | Gerking | B22F 9/082 |
| 2022/0339701 A1 | * | 10/2022 | Güther | B22F 1/065 |

FOREIGN PATENT DOCUMENTS

| | | | |
|---|---|---|---|
| CN | 103386491 A | * | 11/2013 |
| CN | 105642879 A | * | 6/2016 |

(Continued)

OTHER PUBLICATIONS

AMG Engineering: "Electrode Induction Gas Atomization Systems", https://www.ald-vt.com/portfolio/engineering/vacuum-metallurgy/electrode-induction-melting-inert-gas-atomization/; retrieved from internet on May 26, 2023; wayback machine Sep. 27, 2020 (Year: 2020).*

*Primary Examiner* — Alexandra M Moore
*Assistant Examiner* — Austin Pollock
(74) *Attorney, Agent, or Firm* — Muncy, Geissler, Olds & Lowe, P.C.

(57) ABSTRACT

A multi-stage gas atomization preparation method of titanium alloy spherical powder for a 3D printing technology includes the following steps: bar preparation and machining step, multi-stage gas atomization powder preparation step through vacuum induction, and powder screening step. The collision probability of the metal droplets at the gas atomization stage is reduced by controlling the gas atomization pressure and the feeding speed of the titanium alloy electrode bar in a hierarchical manner, so that the collaborative control of the particle size and the surface quality of the (Continued)

titanium alloy 3D printing powder in the gas atomization preparation process is realized.

7 Claims, 10 Drawing Sheets

(51) Int. Cl.
| | |
|---|---|
| *B33Y 40/10* | (2020.01) |
| *B22F 1/065* | (2022.01) |
| *C22C 1/02* | (2006.01) |
| *C22C 14/00* | (2006.01) |
| *B22F 1/05* | (2022.01) |

(52) U.S. Cl.
CPC ............... *C22C 1/02* (2013.01); *C22C 14/00* (2013.01); *B22F 1/05* (2022.01); *B22F 2009/088* (2013.01); *B22F 2009/0836* (2013.01); *B22F 2009/0844* (2013.01); *B22F 2009/0848* (2013.01); *B22F 2009/0872* (2013.01); *B22F 2009/0896* (2013.01); *B22F 2301/205* (2013.01); *B22F 2304/10* (2013.01); *B22F 2998/10* (2013.01)

(56) References Cited

FOREIGN PATENT DOCUMENTS

| | | | | | |
|---|---|---|---|---|---|
| CN | 106166617 | A | * | 11/2016 | ............... B22F 9/082 |
| CN | 106435270 | A | * | 2/2017 | ............ B22F 1/0011 |
| CN | 106636748 | A | * | 5/2017 | ............... B22F 9/082 |
| CN | 110125425 | A | * | 8/2019 | ............... B22F 9/082 |
| CN | 110883338 | A | * | 3/2020 | ............... B22F 9/082 |

\* cited by examiner

MULTI-STAGE GAS ATOMIZATION PREPARATION METHOD OF TITANIUM ALLOY SPHERICAL POWDER FOR 3D PRINTING TECHNOLOGY

CROSS-REFERENCE TO RELATED APPLICATION

This application claims the priority of Chinese patent application No. 202210086640.3, filed on Jan. 25, 2022, which is incorporated herewith by reference.

BACKGROUND OF THE INVENTION

1. Field of the Invention

The present invention belongs to the field of additive manufacturing, and particularly relates to a multi-stage gas atomization preparation method of titanium alloy spherical powder for a 3D printing technology.

2. The Prior Arts

Titanium alloys are widely used in high-end manufacturing fields such as aviation, aerospace, ships and medical devices due to high specific strength, good comprehensive mechanical properties and other advantages. At present, the titanium alloys are mainly divided into TA series α Type titanium alloys, TB series β Type titanium alloys, and TC series α+β Type duplex titanium alloys. In order to meet the needs of the titanium alloys for the complex service environment in the fields, the design of key structural parts is becoming increasingly complex. When traditional manufacturing technologies are used for forming and machining the titanium alloys, the phenomena of low product yield, complex machining process, low machining efficiency and the like occur. For the 3D printing technology, a manufacturing concept of stacking layer by layer is used, a three-dimensional model of a part to be formed is sliced into a two-dimensional section layer by layer, and then the material is stacked layer by layer along the height direction to achieve the manufacturing of metal parts with complex geometric shapes. In the whole process, molds are not needed, personalized customization and flexible production can be achieved, the period from design to manufacturing of the products is shortened, and manufacturing costs and risks are reduced. Therefore, the 3D printing technology has significant advantages in the development and small-batch production of complex titanium alloy parts.

The quality of titanium alloy powder is one of important factors that affect the "shape control and characteristic control" (Direct Metal Laser Sintering (DMLS), Selective Laser Melting (SLM), Laser Engineered Net Shaping (LENS), Electron Beam Melting (EBM)) of 3D printing parts. It is mainly reflected in two aspects: 3D printing process window control and quality and comprehensive mechanical property control for part forming surfaces. The particle size and sphericity of the powder play a crucial role in the 3D printing process window control. Under the condition of optimizing process parameters, the surface quality and oxygen content of spherical powder have a greater impact on the quality of the 3D printing parts. At present, the titanium alloy spherical powder is usually prepared by a vacuum induction gas atomization method, and preparation of the spherical powder with the particle size of 15-53 μm is achieved by adjusting gas atomization process parameters. However, in the aspect of process optimization, a single-stage gas atomization method is used, the gas atomization pressure is a fixed value, the yield of fine powder can be effectively improved when the gas atomization pressure is large, but a large amount of particle-bonded powder and hollow powder appear in the powder. When the gas atomization pressure is small, the surface quality of the spherical powder is significantly improved, but the yield of the fine powder is reduced.

Aiming at the problem of improving the yield of the fine powder and the surface quality of the powder in the gas atomization preparation process of the titanium alloy powder for the 3D printing, the present invention provides a method of flexible control on vacuum induction multi-stage gas atomization pressure, and reduces the collision probability of metal droplets at the gas atomization stage by controlling the gas atomization pressure and the feeding speed of the titanium alloy electrode bar in a hierarchical manner, thereby realizing the collaborative control of particle size and surface quality of the titanium alloy 3D printing powder in the gas atomization preparation process.

SUMMARY OF THE INVENTION

In order to overcome the problem of cooperative control of yield of fine powder and surface quality of spherical powder in the gas atomization preparation process of titanium alloy powder currently used for a 3D printing technology, the present invention provides a multi-stage gas atomization preparation method of spherical powder. The collision probability of the metal droplets at the gas atomization stage is reduced by controlling the gas atomization pressure and the feeding speed of the titanium alloy electrode bar in a hierarchical manner, so that the collaborative control of the particle size and the surface quality of the titanium alloy 3D printing powder in the gas atomization preparation process is realized.

The overall technical scheme used by the present invention is as follows:

The titanium alloy electrode bar is placed on vacuum gas atomization equipment, and a vacuum induction heating power is determined according to the characteristics of alloy smelting points, viscosity of metal droplets, and the like. On the basis of ensuring the uniform smelting of the metal droplets, the feeding speed, the rotation angle speed and the gas atomization pressure of the titanium alloy electrode bar are adjusted according to viscosity of metal droplets, so as to achieve multi-stage flexible control of the titanium alloy vacuum gas atomization powder preparation process. Therefore, the surface quality of the alloy powder can be guaranteed and the yield of the fine powder can be improved.

A multi-stage gas atomization preparation method of titanium alloy spherical powder for a 3D printing technology, comprising the following steps:

step 1 (bar preparation and machining step) smelting a titanium alloy into a titanium alloy bar; and performing a mechanical machining to machine one end of the titanium alloy bar into a conical surface to prepare a titanium alloy electrode bar;

step 2 (multi-stage gas atomization powder preparation step through vacuum induction): using a gas atomization equipment as shown in FIG. 1 for operations, putting the titanium alloy electrode bar into an smelting chamber, clamping and fixing the titanium alloy electrode bar on an adding mechanism, placing the titanium alloy electrode bar into an induction coil, and making a cone angle at one end of the conical surface of the titanium alloy electrode bar align with a center of a gas atomization nozzle; closing a furnace door of the smelting chamber, performing an integral vacuum pumping on the gas atomization equipment, then charging an inert protective gas by the gas atomization nozzle; starting a motor, and controlling a rotation angle speed and a feeding speed of the titanium alloy electrode bar; turning on a smelting power supply, and continuously smelting a front end tip (namely, cone angle of one end of the conical surface) of the titanium alloy electrode bar to form continuous metal droplets, wherein a liquid flow of the metal droplets vertically falls into the center of the gas atomization nozzle; adjusting a gas atomization pressure, and achieving a multi-stage flexible (namely, variable-pressure) control of inert gas, wherein at a moment of the metal droplets dripping into a gas atomization chamber, the gas atomization nozzle spray the inert protective gas, so that the metal droplets are atomized and broken, and solidified into a titanium alloy spherical powder in the gas atomization chamber; and after being cooled by a cooling water system, the titanium alloy spherical powder is transported into a cyclone separator through a powder conveying pipeline, and finally, reaches a powder collection tank (namely, a cyclone powder collection chamber) to obtain the titanium alloy spherical powder; and step 3 (powder screening step): after the titanium alloy spherical powder prepared in the step 2 is cooled, performing a vibration screening according to requirements of different metal 3D printing technologies on particle size of the titanium alloy spherical powder to obtain the titanium alloy spherical powder for the different metal 3D printing technologies, and then performing a vacuum pumping molding for storage.

For the multi-stage gas atomization preparation method of titanium alloy spherical powder for the 3D printing technology, further comprising the following steps:

A titanium alloy raw material composition in the step 1 is a nominal composition of alloys.

The titanium alloy bar in the step 1 is mechanically machined into the titanium alloy electrode bar with a diameter of 50-60 mm, a length of 450-590 mm and a 45-degree conical surface at one end.

During performing the integral vacuum pumping on the gas atomization equipment in the step 2, the gas atomization equipment has a vacuum degree of 5×10-3 Pa, and a leakage and adsorption rate smaller than or equal to 5 Pa m$^3$/s.

In the step 2, the motor is started, the rotation angle speed of the titanium alloy electrode bar is set as 4-6 r/min, and the feeding speed of the titanium alloy electrode bar is set as 0.4-1.0 mm/s.

In the step 2, a vacuum induction heating power of the front end tip of the titanium alloy electrode bar is between 27-35 kW, and is adjusted according to a smelting condition of the titanium alloy electrode bar.

In the step 2, the inert protective gas is argon.

In the step 2, a multi-stage gas atomization process is used for flexible control, when the metal droplets begin to drip, the gas atomization chamber, a valve of a tail discharge and a feeding mechanism are turned on, the feeding mechanism moves the titanium alloy electrode bar up and down, at a moment of the metal droplets dripping into the gas atomization chamber, the gas atomization nozzle spray the inert protective gas, so that the metal droplets are atomized and broken, and the multi-stage gas atomization process is set in sequence as below: (1) the gas atomization pressure is 5.5-6.5 MPa, and the feeding speed of the titanium alloy electrode bar is 0.4-0.6 mm/s; (2) the gas atomization pressure is 5-6 MPa, and the feeding speed of the titanium alloy electrode bar is 0.5-0.6 mm/s; (3) the gas atomization pressure is 5-6 MPa, and the feeding speed of the titanium alloy electrode bar is 0.6-0.7 mm/s; (4) the gas atomization pressure is 5-5.5 MPa, and the feeding speed of the titanium alloy electrode bar is 0.7-0.8 mm/s; (5) the gas atomization pressure is 5-5.5 MPa, and the feeding speed of the titanium alloy electrode bar is 0.8-0.9 mm/s; and (6) the gas atomization pressure is 4.5-5.5 MPa, and the feeding speed of the titanium alloy electrode bar is 0.9-1.0 mm/s; wherein time for each of the multi-stage gas atomization processes (1) to (6) is 10 seconds; and wherein the number of cycles of the multi-stage gas atomization processes (1) to (6) is 9-12.

In the gas atomization process of the step 2, monitoring a gas atomization state of the metal droplets in the gas atomization chamber through an observation window, if the metal droplets spray upwards and return to the gas atomization nozzle, the gas atomization process stops immediately.

In the step 3, the requirements of the 3D printing technology for the titanium alloys on the particle size of the titanium alloy spherical powder are as below:

A selective laser smelting technology: performing the vibration screening to obtain titanium alloy spherical powder with the particle size of 15-53 μm and performing the vacuum molding; and a Plasma beam technology: performing the vibration screening to obtain the titanium alloy spherical powder with the particle size of 53-100 μm and performing the vacuum molding.

The titanium alloy spherical powder prepared in the step 3 for the 3D printing technology at least has the following advantages: (1) good sphericity; (2) an increment of oxygen (O) and nitrogen (N) elements of the titanium alloy spherical powder is less than 0.035% (350 ppm); (3) an element composition is stable; and (4) no alloy element fire waste occurs.

The titanium alloy spherical powder prepared in the step 3 for the 3D printing technology is TA15 titanium alloy spherical powder, TA7 titanium alloy spherical powder, TA17 titanium alloy spherical powder, TC4 titanium alloy spherical powder, TC11 titanium alloy spherical powder, TC21 titanium alloy spherical powder, Ti-10V-2Fe-3Al titanium alloy spherical powder, Ti-6Mo-5V-3Al-2Fe-2Zr titanium alloy spherical powder or Ti-5Mo-5V-6Cr-3Al titanium alloy spherical powder.

At present, titanium alloy 3D printing powder is mostly prepared by a vacuum induction single-stage gas atomization method. The preparation process of the titanium alloy spherical powder is more sensitive to superheat. When a vacuum induction heating power is fixed, and the gas atomization pressure and the feeding speed of the titanium alloy electrode bar are improved at the same time, the yield of the fine powder is higher, but the surface quality of the titanium alloy spherical powder decreases significantly, and irregular powder is characterized by embedded particle-bonded powder and surface tear. If the gas atomization pressure and the feeding speed of the titanium alloy electrode bar are reduced, the surface quality of the spherical powder is significantly improved, but the particle size of the powder is increased and the yield of fine powder is significantly reduced, thereby adversely affecting the 3D printing and shaping of titanium alloys.

The method disclosed by the present invention can ensure the surface quality of the titanium alloy spherical powder and improve the yield of the alloy fine powder. An innovation of the preparation method of the present invention is to design a flexible control process for multi-stage gas atomization pressure and the feeding speed of the titanium alloy electrode bar. On the basis of ensuring the yield of the fine powder, the probability that metal droplets collide with each other in the gas atomization stage is reduced, and the sphericity of the titanium alloy spherical powder is good, which solves the problem that the titanium alloy spherical powder preparation process of the single-stage gas atomization method cannot realize collaborative control of the particle size and the sphericity of the titanium alloy 3D printing special powder in the preparation process, and in the field of engineering application, the technology can significantly improve the quality of the titanium alloy spherical powder and obtain good economic benefits.

In conclusion, compared with the prior art, the method disclosed by the present invention has the following advantages and beneficial effects:

1. According to the multi-stage gas atomization preparation method of titanium alloy spherical powder for a 3D printing technology, flexible control of gas atomization pressure and the feeding speed of the titanium alloy electrode bar is realized. In the initial gas atomization stage, the metal droplets can rapidly solidify under the gas atomization pressure of 5.5-6.5 Mpa, at this time, the feeding speed of the titanium alloy electrode bar is low, and the collision probability of the metal droplets is reduced. With the gas atomization, the gas atomization pressure is reduced to 5-5.5 MPa, and the feeding speed of the titanium alloy electrode bar is gradually increased to ensure the yield of the fine powder. When the feeding speed of the titanium alloy electrode bar is increased to 0.9 mm/s, the gas atomization pressure is reduced to 4.5-5.5 MPa; at this time, the particle size of the titanium alloy spherical powder tends to increase, but the collision probability of the metal droplets can be reduced, and the retention time is short (10 seconds). After the operations are performed for 9-12 times according to the method, the titanium alloy spherical powder has good sphericity and good surface quality, and is suitable for 3D printing additive manufacturing.

2. The titanium alloy spherical powder prepared by the method disclosed by the present invention has stable element composition, has no alloy element fire waste, has less than 0.035% (350 ppm) increment of oxygen (O) and nitrogen (N) elements and has good sphericity, and comprehensive physical properties meet the 3D printing requirements.

DETAILED DESCRIPTION OF THE PREFERRED EMBODIMENT

Embodiment 1

A multi-stage gas atomization preparation method of TA15 titanium alloy spherical powder for a 3D printing technology comprises the following steps:

Step 1 (bar preparation and machining step): smelting a TA15 titanium alloy into a TA15 titanium alloy bar, and components of the raw materials of the TA15 titanium alloy meet the following requirements: 5.5-7.0% of aluminium (Al), 0.5-2.0% of molybdenum (Mo), 1.5-2.5% of zirconium (Zr), 0.8-2.5% of vanadium (V), silicon (Si) being smaller than or equal to 0.15%, iron (Fe) being smaller than or equal to 0.25%, carbon (C) being smaller than or equal to 0.10%, oxygen (O) being smaller than or equal to 0.15%, nitrogen (N) being smaller than or equal to 0.05%, hydrogen (H) being smaller than or equal to 0.015%, and the balance of titanium (Ti); and the TA15 titanium alloy bar is mechanically machined into a TA15 titanium alloy electrode bar 3 with a diameter of 55 mm, a length of 520 mm and a 45-degree conical surface at one end.

Figure 1:
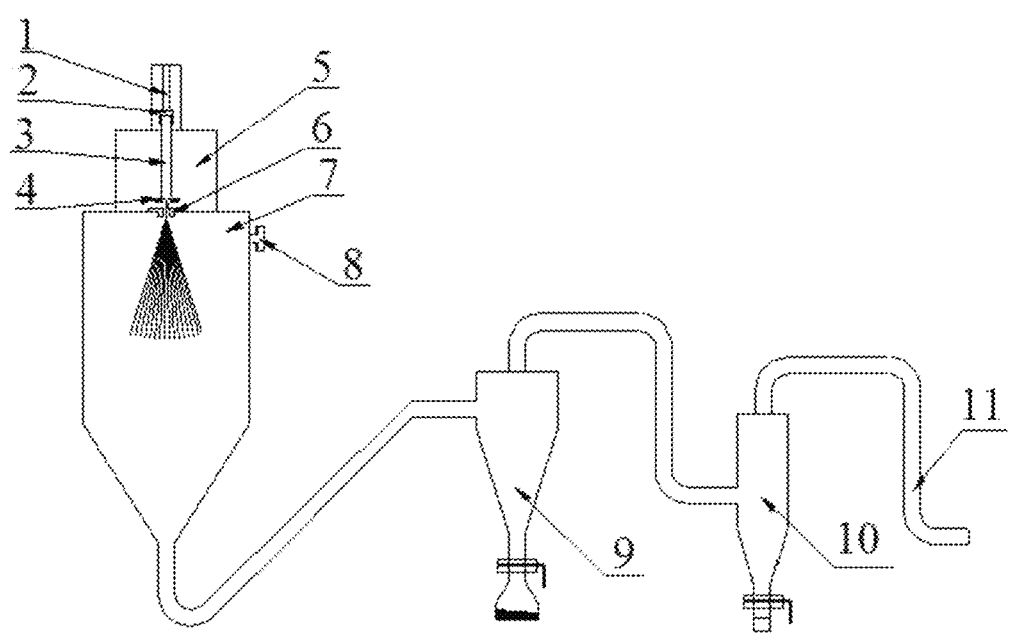
FIG. 1 shows the structure diagram of vacuum gas atomization equipment; 1: feeding mechanism, 2: adding mechanism, 3: titanium alloy electrode bar, 4: induction coil, 5: smelting chamber, 6: gas atomization nozzle, 7: gas atomization chamber, 8: observation window, 9: cyclone separator, 10: powder collection tank, 11: tail discharge.

Step 2 (multi-stage gas atomization powder preparation step through vacuum induction): using a vacuum gas atomization equipment as shown in FIG. 1 for operations, putting the TA15 titanium alloy electrode bar 3 into a smelting chamber 5, clamping and fixing the TA15 titanium alloy electrode bar 3 on an adding mechanism 2 to guarantee a verticality of the TA15 titanium alloy electrode bar 3, placing the TA15 titanium alloy electrode bar 3 into an induction coil 4, and making a cone angle at one end of the conical surface of the TA15 titanium alloy electrode bar 3 align with a center of a gas atomization nozzle 6; closing a furnace door (not shown) of the smelting chamber 5, performing an integral vacuum pumping on the gas atomization equipment to a vacuum degree of $5 \times 10^{-3}$ Pa and a leakage and adsorption rate smaller than or equal to 5 Pa m$^3$/s, then charging an inert protective gas (not shown) by the gas atomization nozzle 6; starting a motor (not shown), and setting a rotation angle speed of the TA15 titanium alloy electrode bar 3 as 4 r/min; turning on a smelting power supply (not shown), and setting a vacuum induction heating power as 33 kW, and continuously smelting a front end tip (namely, cone angle of one end of the conical surface) of the TA15 titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the TA15 titanium alloy electrode bar 3 up and down (vertical to a bottom surface direction) to achieve a purpose of feeding the TA15 titanium alloy electrode bar 3, at a moment of the metal droplets dripping into the gas atomization chamber 7, the gas atomization nozzle 6 spray the inert protective gas, so that the metal droplets are atomized and broken, and solidified into a TA15 titanium alloy spherical powder in the gas atomization chamber 7, and the multi-stage gas atomization process is set in sequence as below: (1) the gas atomization pressure is 6.5 MPa, and the feeding speed of the TA15 titanium alloy electrode bar 3 is 0.4 mm/s; (2) the gas atomization pressure is 6 MPa, and the feeding speed of the TA15 titanium alloy electrode bar 3 is 0.5 mm/s; (3) the gas atomization pressure is 5.5 MPa, and the feeding speed of the TA15 titanium alloy electrode bar 3 is 0.6 mm/s; (4) the gas atomization pressure is 5.5 MPa, and the feeding speed of the TA15 titanium alloy electrode bar 3 is 0.7 mm/s; (5) the gas atomization pressure is 5.5 MPa, and the feeding speed of the TA15 titanium alloy electrode bar 3 is 0.8 mm/s; and (6) the gas atomization pressure is 5.5 MPa, and the feeding speed of the TA15 titanium alloy electrode bar 3 is 0.9 mm/s; wherein time for each of the multi-stage gas atomization processes (1) to (6) is 10 seconds; and wherein the number of cycles of the multi-stage gas atomization processes (1) to (6) is 12; and after being cooled by a cooling water system (not shown), the TA15 titanium alloy spherical powder is transported into a cyclone separator 9 through a powder conveying pipeline, and finally, reaches a powder collection tank 10 to obtain the TA15 titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the TA15 titanium alloy spherical powder prepared in the step 2 is cooled, performing a vibration screening according to the requirements of different metal 3D printing technologies on particle size of the TA15 titanium alloy spherical powder; a selective laser smelting technology: performing a vibration screening on the TA15 titanium alloy spherical powder to obtain the TA15 titanium alloy spherical powder with the particle size of 15-53 μm and performing a vacuum molding; and a Plasma beam technology: performing a vibration screening on the TA15 titanium alloy spherical powder to obtain the TA15 titanium alloy spherical powder with the particle size of 53-100 μm and performing a vacuum molding.

Figure 2:
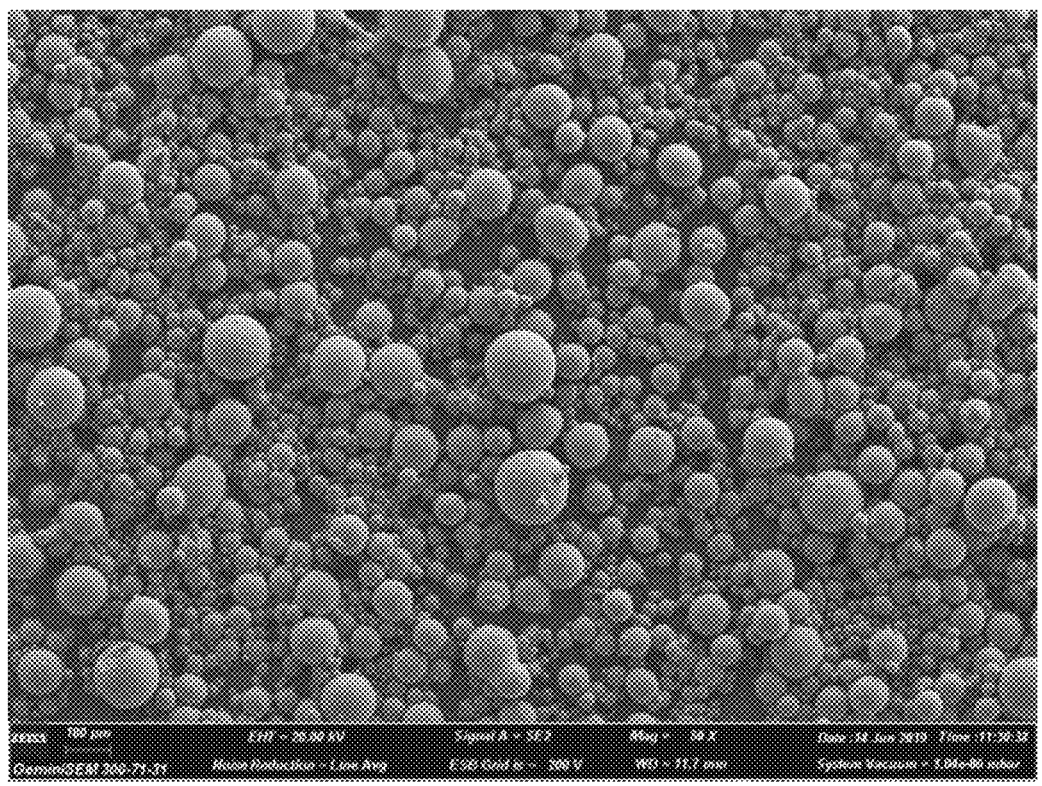
FIG. 2 shows the topography image of TA15 titanium alloy spherical powder prepared in embodiment 1.

The topography image of the TA15 titanium alloy spherical powder prepared in Embodiment 1 is shown as FIG. 2, and the TA15 titanium alloy spherical powder has the following advantages: (1) good sphericity; (2) an increment of oxygen (O) and nitrogen (N) elements of the TA15 titanium alloy spherical powder is less than 0.035% (350 ppm); (3) an element composition is stable; (4) no alloy element fire waste occurs; (5) D90 is 58.8 μm, and D90 means 90% of the total particles are smaller than this size; (6) a loose density of the TA15 titanium alloy spherical powder is 3.41 g·cm−3; (7) an average sphericity is greater than or equal to 90%; (8) a fluidity of the TA15 titanium alloy spherical powder is good and smaller than or equal to 39 s/50 g; and (9) a yield of the TA15 titanium alloy spherical powder with the particle size of 15-53 μm is 32%. Therefore, the requirements of 3D printing can be met by the TA15 titanium alloy spherical powder.

Embodiment 2

A multi-stage gas atomization preparation method of TA7 titanium alloy spherical powder for a 3D printing technology comprises the following steps:

Step 1 (bar preparation and machining step): smelting a TA7 titanium alloy into TA7 titanium alloy bar, and components of the raw materials of the TA7 titanium alloy meet the following requirements: 4.0-6.0% of aluminium (Al), 2.0-3.0% of stannum (Sn), oxygen (O) being smaller than or equal to 0.20%, hydrogen (H) being smaller than or equal to 0.15%, nitrogen (N) being smaller than or equal to 0.05%, carbon (C) being smaller than or equal to 0.10%, iron (Fe) being smaller than or equal to 0.50%, and the balance of titanium (Ti); and the TA7 titanium alloy bar is mechanically machined into a TA7 titanium alloy electrode bar 3 with a diameter of 55 mm, a length of 490 mm and a 45-degree conical surface at one end.

Step 2 (multi-stage gas atomization powder preparation step through vacuum induction): using a vacuum gas atomization equipment as shown in FIG. 1 for operations, putting the TA7 titanium alloy electrode bar 3 into a smelting chamber 5, clamping and fixing the TA7 titanium alloy electrode bar 3 on an adding mechanism 2 to guarantee a verticality of the TA7 titanium alloy electrode bar 3, placing the TA7 titanium alloy electrode bar 3 into an induction coil 4, and making a cone angle at one end of the conical surface of the TA7 titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m3/s, then charging an inert protective gas (not shown) by the gas atomization nozzle 6; starting a motor (not shown), and setting a rotation angle speed of the TA7 titanium alloy electrode bar 3 as 4 r/min; turning on a smelting power supply (not shown), and setting a vacuum induction heating power as 31 kW, and continuously smelting a front end tip (namely, cone angle of one end of the conical surface) of the TA7 titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the TA7 titanium alloy electrode bar 3 up and down (vertical to a bottom surface direction) to achieve a purpose of feeding the TA7 titanium alloy electrode bar 3, at a moment of the metal droplets dripping into the gas atomization chamber 7, the gas atomization nozzle 6 spray the inert protective gas, so that the metal droplets are atomized and broken, and solidified into a TA7 titanium alloy spherical powder in the gas atomization chamber 7, and the multi-stage gas atomization process is set in sequence as below: (1) the gas atomization pressure is 6 MPa, and the feeding speed of the TA7 titanium alloy electrode bar 3 is 0.4 mm/s; (2) the gas atomization pressure is 5.5 MPa, and the feeding speed of the TA7 titanium alloy electrode bar 3 is 0.5 mm/s; (3) the gas atomization pressure is 5.5 MPa, and the feeding speed of the TA7 titanium alloy electrode bar 3 is 0.6 mm/s; (4) the gas atomization pressure is 5.5 MPa, and the feeding speed of the TA7 titanium alloy electrode bar 3 is 0.7 mm/s; (5) the gas atomization pressure is 5 MPa, and the feeding speed of the TA7 titanium alloy electrode bar 3 is 0.8 mm/s; and (6) the gas atomization pressure is 5 MPa, and the feeding speed of the TA7 titanium alloy electrode bar 3 is 1.0 mm/s; wherein time for each of the multi-stage gas atomization processes (1) to (6) is 10 seconds and wherein the number of cycles of the multi-stage gas atomization processes (1) to (6) is 11; and after being cooled by a cooling water system (not shown), the TA7 titanium alloy spherical powder is transported into a cyclone separator 9 through a powder conveying pipeline, and finally, reaches a powder collection tank 10 to obtain the TA7 titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the TA7 titanium alloy spherical powder prepared in the step 2 is cooled, performing a vibration screening according to the requirements of different metal 3D printing technologies on particle size of the TA7 titanium alloy spherical powder; a selective laser smelting technology: performing a vibration screening on the TA7 titanium alloy spherical powder to obtain the TA7 titanium alloy spherical powder with the particle size of 15-53 μm and performing a vacuum molding; and a Plasma beam technology: performing a vibration screening on the TA7 titanium alloy spherical powder to obtain the TA7 titanium alloy spherical powder with the particle size of 53-100 μm and performing a vacuum molding.

Figure 3:
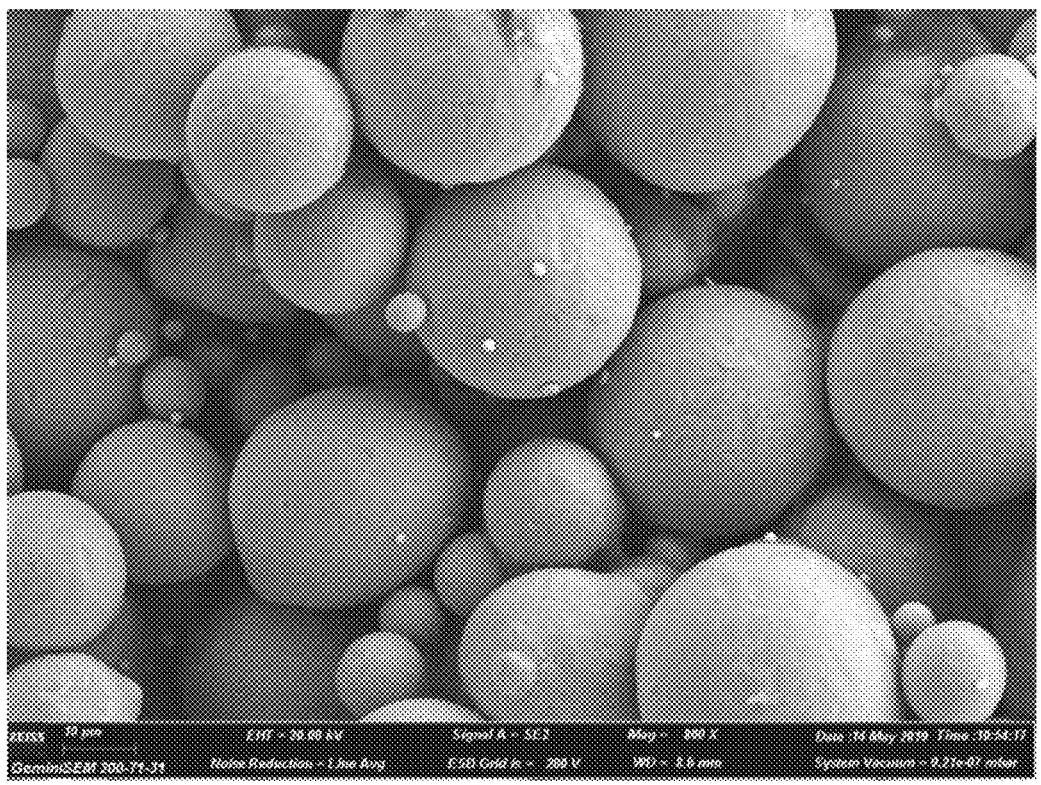
FIG. 3 shows the topography image of TA7 titanium alloy spherical powder prepared in embodiment 2.

The topography image of the TA7 titanium alloy spherical powder prepared in Embodiment 2 is shown as FIG. 3, and the TA7 titanium alloy spherical powder has the following advantages: (1) good sphericity; (2) an increment of oxygen (O) and nitrogen (N) elements of the TA7 titanium alloy spherical powder is less than 0.035% (350 ppm); (3) an element composition is stable; (4) no alloy element fire waste occurs; (5) D90 is 60.3 μm, and D90 means 90% of the total particles are smaller than this size; (6) a loose density of the TA7 titanium alloy spherical powder is 3.26 g·cm−3; (7) an average sphericity is greater than or equal to 90%; (8) a fluidity of TA7 titanium alloy spherical powder is good and smaller than or equal to 38 s/50 g; and (9) a yield of the TA7 titanium alloy spherical powder with the particle size of 15-53 μm is 30%. Therefore, the requirements of 3D printing can be met by the TA7 titanium alloy spherical powder.

Embodiment 3

A multi-stage gas atomization preparation method of TA17 titanium alloy spherical powder for a 3D printing technology comprises the following steps:

Step 1 (bar preparation and machining step): smelting a TA17 titanium alloy into a TA17 titanium alloy bar, and components of the raw materials of the TA17 titanium alloy meet the following requirements: 4.0-5.0% of aluminium (Al), 1.8-2.5% of vanadium (V), 0.10-0.20% of iron (Fe), silicon (Si) being smaller than or equal to 0.04%, carbon (C) being smaller than or equal to 0.03%, nitrogen (N) being smaller than or equal to 0.03%, hydrogen (H) being smaller than or equal to 0.003%, oxygen (O) being smaller than or equal to 0.08%, and the balance of titanium (Ti); and the TA17 titanium alloy bar is mechanically machined into a TA17 titanium alloy electrode bar 3 with a diameter of 55 mm, a length of 540 mm and a 45-degree conical surface at one end.

Step 2 (multi-stage gas atomization powder preparation step through vacuum induction): using a vacuum gas atomization equipment as shown in FIG. 1 for operations, putting the TA17 titanium alloy electrode bar 3 into a smelting chamber 5, clamping and fixing the TA17 titanium alloy electrode bar 3 on an adding mechanism 2 to guarantee a verticality of the TA17 titanium alloy electrode bar 3, placing the TA17 titanium alloy electrode bar 3 into an induction coil 4, and making a cone angle at one end of the conical surface of the TA17 titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m3/s, then charging an inert protective gas (not shown) by the gas atomization nozzle 6; starting a motor (not shown), and setting a rotation angle speed of the TA17 titanium alloy electrode bar 3 as 4 r/min; turning on a smelting power supply (not shown), and setting a vacuum induction heating power as 32 kW, and continuously smelting a front end tip (namely, cone angle of one end of the conical surface) of the TA17 titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the TA17 titanium alloy electrode bar 3 up and down (vertical to a bottom surface direction) to achieve a purpose of feeding the TA17 titanium alloy electrode bar 3, at a moment of the metal droplets dripping into the gas atomization chamber 7, the gas atomization nozzle 6 spray the inert protective gas, so that the metal droplets are atomized and broken, and solidified into a TA17 titanium alloy spherical powder in the gas atomization chamber 7, and the multi-stage gas atomization process is set as below: (1) the gas atomization pressure is 5.5 MPa, and the feeding speed of the TA17 titanium alloy electrode bar 3 is 0.4 mm/s; (2) the gas atomization pressure is 5 MPa, and the feeding speed of the TA17 titanium alloy electrode bar 3 is 0.5 mm/s; (3) the gas atomization pressure is 5 MPa, and the feeding speed of the TA17 titanium alloy electrode bar 3 is 0.6 mm/s; (4) the gas atomization pressure is 5 MPa, and the feeding speed of the TA17 titanium alloy electrode bar 3 is 0.7 mm/s; (5) the gas atomization pressure is 5 MPa, and the feeding speed of the TA17 titanium alloy electrode bar 3 is 0.9 mm/s; and (6) the gas atomization pressure is 5 MPa, and the feeding speed of the TA17 titanium alloy electrode bar 3 is 1.0 mm/s; wherein time for each of the multi-stage gas atomization processes (1) to (6) is 10 seconds; and wherein the number of cycles of the multi-stage gas atomization processes (1) to (6) is 12; and after being cooled by a cooling water system (not shown), the TA17 titanium alloy spherical powder is transported into a cyclone separator 9 through a powder conveying pipeline, and finally, reaches a powder collection tank 10 to obtain the TA17 titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the TA17 titanium alloy spherical powder prepared in the step 2 is cooled, performing a vibration screening according to the requirements of different metal 3D printing technologies on particle size of the TA17 titanium alloy spherical powder; a selective laser smelting technology: performing a vibration screening on the TA17 titanium alloy spherical powder to obtain the TA17 titanium alloy spherical powder with the particle size of 15-53 μm and performing a vacuum molding; and a Plasma beam technology: performing a vibration screening on the TA17 titanium alloy spherical powder to obtain the TA17 titanium alloy spherical powder with the particle size of 53-100 μm and performing a vacuum molding.

Figure 4:
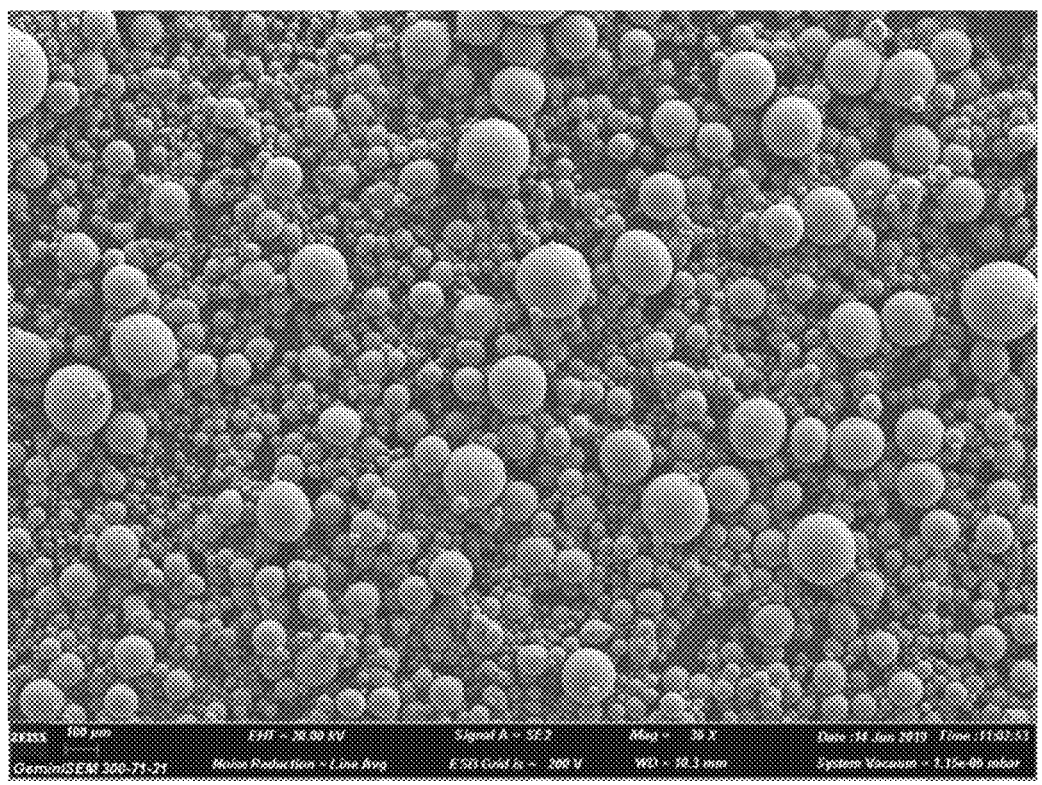
FIG. 4 shows the topography image of TA17 titanium alloy spherical powder prepared in embodiment 3.

The topography image of the TA17 titanium alloy spherical powder prepared in Embodiment 3 is shown as FIG. 4, and the TA17 titanium alloy spherical powder has the following advantages: (1) good sphericity; (2) an increment of oxygen (O) and nitrogen (N) elements of the TA17 titanium alloy spherical powder is less than 0.035% (350 ppm); (3) an element composition is stable; (4) no alloy element fire waste occurs; (5) D90 is 66.7 μm, and D90 means 90% of the total particles are smaller than this size; (6) a loose density of the TA17 titanium alloy spherical powder is 3.02 g·cm−3; (7) an average sphericity is greater than or equal to 90%; (8) a fluidity of the TA17 titanium alloy spherical powder is good and smaller than or equal to 37 s/50 g; and (9) a yield of the TA17 titanium alloy spherical powder with the particle size of 15-53 μm is 29%. Therefore, the requirements of 3D printing can be met by the TA17 titanium alloy spherical powder.

Embodiment 4

A multi-stage gas atomization preparation method of Ti-10V-2Fe-3Al titanium alloy spherical powder for a 3D printing technology comprises the following steps:

Step 1 (bar preparation and machining step): smelting a Ti-10V-2Fe-3Al titanium alloy into a Ti-10V-2Fe-3Al titanium alloy bar, and components of the raw materials of the Ti-10V-2Fe-3Al titanium alloy meet the following requirements: 2.8-3.2% of aluminium (Al), 9.6-10.3% of vanadium (V), 1.8-2.3% of iron (Fe), oxygen (O) being smaller than or equal to 0.09%, nitrogen (N) being smaller than or equal to 0.05%, and the balance of titanium (Ti); and the Ti-10V-2Fe-3Al titanium alloy bar is mechanically machined into a Ti-10V-2Fe-3Al titanium alloy electrode bar 3 with a diameter of 55 mm, a length of 510 mm and a 45-degree conical surface at one end.

Step 2 (multi-stage gas atomization powder preparation step through vacuum induction): using a vacuum gas atomization equipment as shown in FIG. 1 for operations, putting the Ti-10V-2Fe-3Al titanium alloy electrode bar 3 into a smelting chamber 5, clamping and fixing the Ti-10V-2Fe-3Al titanium alloy electrode bar 3 on an adding mechanism 2 to guarantee a verticality of the Ti-10V-2Fe-3Al titanium alloy electrode bar 3, placing the Ti-10V-2Fe-3Al titanium alloy electrode bar 3 into an induction coil 4, and making a cone angle at one end of the conical surface of the Ti-10V-2Fe-3Al titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m³/s, then charging an inert protective gas (not shown) by the gas atomization nozzle 6; starting a motor (not shown), and setting a rotation angle speed of the Ti-10V-2Fe-3Al titanium alloy electrode bar 3 as 5 r/min; turning on a smelting power supply (not shown), and setting a vacuum induction heating power as 28 kW, and continuously smelting a front end tip (namely, cone angle of one end of the conical surface) of the Ti-10V-2Fe-3Al titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the Ti-10V-2Fe-3Al titanium alloy electrode bar 3 up and down (vertical to a bottom surface direction) to achieve a purpose of feeding the Ti-10V-2Fe-3Al titanium alloy electrode bar 3, at a moment of the metal droplets dripping into the gas atomization chamber 7, the gas atomization nozzle 6 spray the inert protective gas, so that the metal droplets are atomized and broken, and solidified into a Ti-10V-2Fe-3Al titanium alloy spherical powder in the gas atomization chamber 7, and the multi-stage gas atomization process is set in sequence as below: (1) the gas atomization pressure is 6 MPa, and the feeding speed of the Ti-10V-2Fe-3Al titanium alloy electrode bar 3 is 0.6 mm/s; (2) the gas atomization pressure is 6 MPa, and the feeding speed of the Ti-10V-2Fe-3Al titanium alloy electrode bar 3 is 0.6 mm/s; (3) the gas atomization pressure is 5.5 MPa, and the feeding speed of the Ti-10V-2Fe-3Al titanium alloy electrode bar 3 is 0.7 mm/s; (4) the gas atomization pressure is 5.5 MPa, and the feeding speed of the Ti-10V-2Fe-3Al titanium alloy electrode bar 3 is 0.8 mm/s; (5) the gas atomization pressure is 5.5 MPa, and the feeding speed of the Ti-10V-2Fe-3Al titanium alloy electrode bar 3 is 0.9 mm/s; and (6) the gas atomization pressure is 5 MPa, and the feeding speed of the Ti-10V-2Fe-3Al titanium alloy electrode bar 3 is 1.0 mm/s; time for each of the multi-stage gas atomization processes (1) to (6) is 10 seconds; and wherein the number of cycles of the multi-stage gas atomization processes (1) to (6) is 10; and after being cooled by a cooling water system (not shown), the Ti-10V-2Fe-3Al titanium alloy spherical powder is transported into a cyclone separator 9 through a powder conveying pipeline, and finally, reaches a powder collection tank 10 to obtain the Ti-10V-2Fe-3Al titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the Ti-10V-2Fe-3Al titanium alloy spherical powder prepared in the step 2 is cooled, performing a vibration screening according to the requirements of different metal 3D printing technologies on particle size of the Ti-10V-2Fe-3Al titanium alloy spherical powder; a selective laser smelting technology: performing a vibration screening on the Ti-10V-2Fe-3Al titanium alloy spherical powder to obtain the Ti-10V-2Fe-3Al titanium alloy spherical powder with the particle size of 15-53 μm and performing a vacuum molding; and a Plasma beam technology: performing a vibration screening on the Ti-10V-2Fe-3Al titanium alloy spherical powder to obtain the Ti-10V-2Fe-3Al titanium alloy spherical powder with the particle size of 53-100 μm and performing a vacuum molding.

Figure 5:
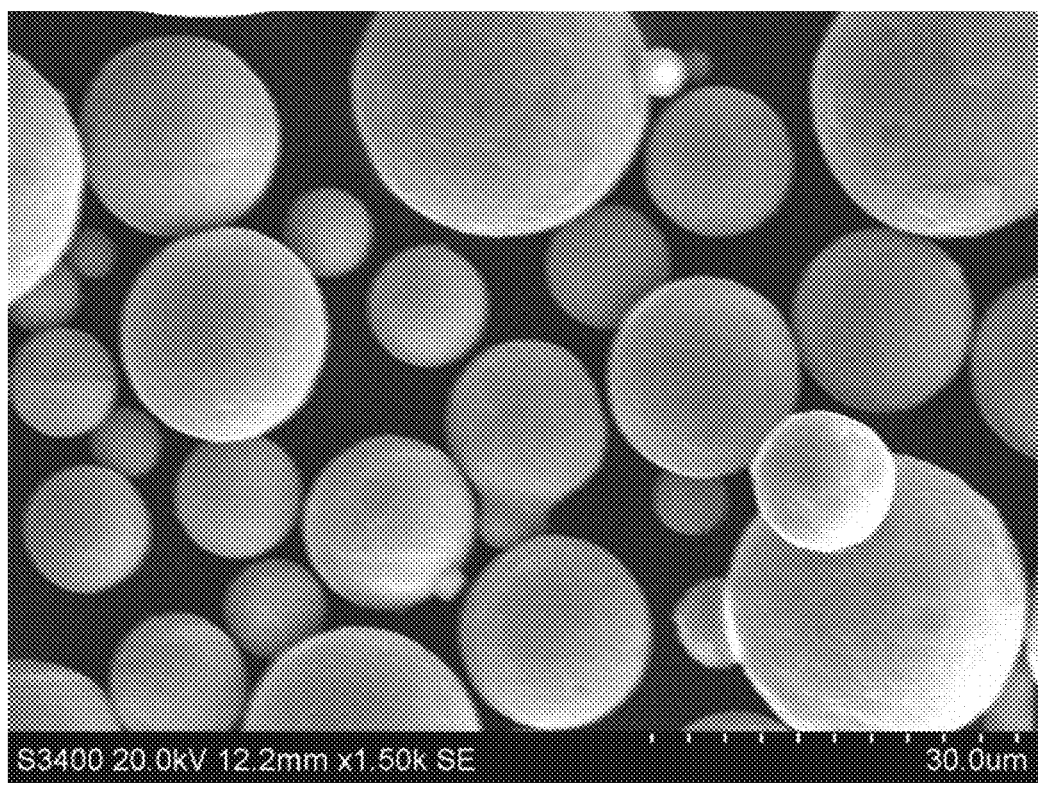
FIG. 5 shows the topography image of Ti-10V- 2Fe-3Al titanium alloy spherical powder prepared in embodiment 4.
Figure 6:
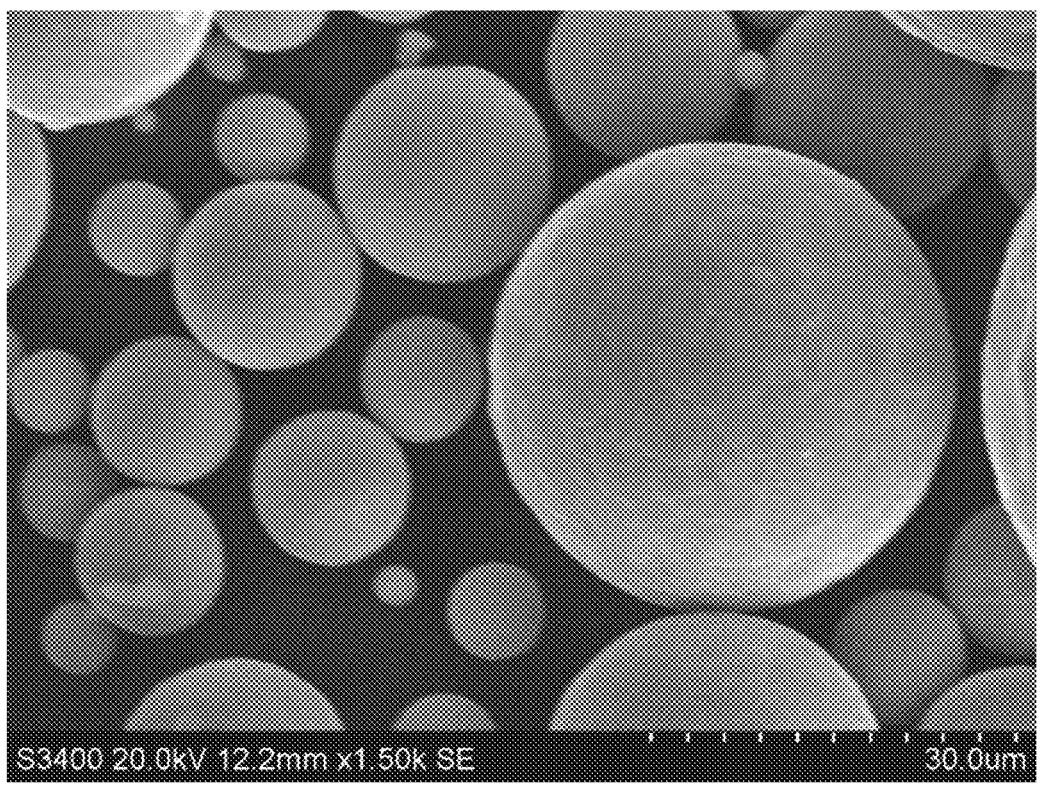
FIG. 6 shows the topography image of Ti-6Mo-5V-3Al-2Fe-2Zr titanium alloy spherical powder prepared in embodiment 5.

The topography image of the Ti-10V-2Fe-3Al titanium alloy spherical powder prepared in Embodiment 4 is shown as FIG. 5, and the Ti-10V-2Fe-3Al titanium alloy spherical powder has the following advantages: (1) good sphericity; (2) an increment of oxygen (O) and nitrogen (N) elements of the Ti-10V-2Fe-3Al titanium alloy spherical powder is less than 0.032% (320 ppm); (3) an element composition is stable; (4) no alloy element fire waste occurs; (5) D90 is 54.9 μm, and D90 means 90% of the total particles are smaller than this size; (6) a loose density of the Ti-10V-2Fe-3Al titanium alloy spherical powder is 3.86 g·cm−3; (7) an average sphericity is greater than or equal to 90%; (8) a fluidity of the Ti-10V-2Fe-3Al titanium alloy spherical powder is good and smaller than or equal to 43 s/50 g; and (9) a yield of the Ti-10V-2Fe-3Al titanium alloy spherical powder with the particle size of 15-53 μm is 34%. Therefore, the requirements of 3D printing can be met by the Ti-10V-2Fe-3Al titanium alloy spherical powder.

Embodiment 5

A multi-stage gas atomization preparation method of Ti-6Mo-5V-3Al-2Fe-2Zr titanium alloy spherical powder for a 3D printing technology comprises the following steps:

Step 1 (bar preparation and machining step): smelting a Ti-6Mo-5V-3Al-2Fe-2Zr titanium alloy into a Ti-6Mo-5V-3Al-2Fe-2Zr titanium alloy bar, and components of the raw materials of the Ti-6Mo-5V-3Al-2Fe-2Zr titanium alloy meet the following requirements: 2.8-3.2% of aluminium (Al), 5.8-6.1% of molybdenum (Mo), 4.7-5.2% of vanadium (V), 1.8-2.2% of zirconium (Zr), 1.8-2.2% of iron (Fe), oxygen (O) being smaller than or equal to 0.09%, nitrogen (N) being smaller than or equal to 0.05%, and the balance of titanium (Ti); and the Ti-6Mo-5V-3Al-2Fe-2Zr titanium alloy bar is mechanically machined into a Ti-6Mo-5V-3Al-2Fe-2Zr titanium alloy electrode bar 3 with a diameter of 55 mm, a length of 560 mm and a 45-degree conical surface at one end.

Step 2 (multi-stage gas atomization powder preparation step through vacuum induction): using a vacuum gas atomization equipment as shown in FIG. 1 for operations, putting the Ti-6Mo-5V-3Al-2Fe-2Zr titanium alloy electrode bar 3 into a smelting chamber 5, clamping and fixing the Ti-6Mo-5V-3Al-2Fe-2Zr titanium alloy electrode bar 3 on an adding mechanism 2 to guarantee a verticality of the Ti-6Mo-5V-3Al-2Fe-2Zr titanium alloy electrode bar 3, placing the Ti-6Mo-5V-3Al-2Fe-2Zr titanium alloy electrode bar 3 into an induction coil 4, and making a cone angle at one end of the conical surface of the Ti-6Mo-5V-3Al-2Fe-2Zr titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10-3 Pa and a leakage and adsorption rate smaller than or equal to 5 Pa m$^3$/s, then charging an inert protective gas (not shown) by the gas atomization nozzle 6; starting a motor (not shown), and setting a rotation angle speed of the Ti-6Mo-5V-3Al-2Fe-2Zr titanium alloy electrode bar 3 as 5 r/min; turning on a smelting power supply (not shown), and setting a vacuum induction heating power as 29 kW, and continuously smelting a front end tip (namely, cone angle of one end of the conical surface) of the Ti-6Mo-5V-3Al-2Fe-2Zr titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the Ti-6Mo-5V-3Al-2Fe-2Zr titanium alloy electrode bar 3 up and down (vertical to a bottom surface direction) to achieve a purpose of feeding the Ti-6Mo-5V-3Al-2Fe-2Zr titanium alloy electrode bar 3, at a moment of the metal droplets dripping into the gas atomization chamber 7, the gas atomization nozzle 6 spray the inert protective gas, so that the metal droplets are atomized and broken, and solidified into a Ti-6Mo-5V-3Al-2Fe-2Zr titanium alloy spherical powder in the gas atomization chamber 7, and the multi-stage gas atomization process is set in sequence as below: (1) the gas atomization pressure is 6.5 MPa, and the feeding speed of the Ti-6Mo-5V-3Al-2Fe-2Zr titanium alloy electrode bar 3 is 0.6 mm/s; (2) the gas atomization pressure is 6 MPa, and the feeding speed of the Ti-6Mo-5V-3Al-2Fe-2Zr titanium alloy electrode bar 3 is 0.6 mm/s; (3) the gas atomization pressure is 5.5 MPa, and the feeding speed of the Ti-6Mo-5V-3Al-2Fe-2Zr titanium alloy electrode bar 3 is 0.7 mm/s; (4) the gas atomization pressure is 5.5 MPa, and the feeding speed of the Ti-6Mo-5V-3Al-2Fe-2Zr titanium alloy electrode bar 3 is 0.8 mm/s; (5) the gas atomization pressure is 5 MPa, and the feeding speed of the Ti-6Mo-5V-3Al-2Fe-2Zr titanium alloy electrode bar 3 is 0.9 mm/s; and (6) the gas atomization pressure is 5 MPa, and the feeding speed of the Ti-6Mo-5V-3Al-2Fe-2Zr titanium alloy electrode bar 3 is 1.0 mm/s; wherein time for each of the multi-stage gas atomization processes (1) to (6) is 10 seconds; and wherein the number of cycles of the multi-stage gas atomization processes (1) to (6) is 11; and after being cooled by a cooling water system (not shown), the Ti-6Mo-5V-3Al-2Fe-2Zr titanium alloy spherical powder is transported into a cyclone separator 9 through a powder conveying pipeline, and finally, reaches a powder collection tank 10 to obtain the Ti-6Mo-5V-3Al-2Fe-2Zr titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the Ti-6Mo-5V-3Al-2Fe-2Zr titanium alloy spherical powder prepared in the step 2 is cooled, performing a vibration screening according to the requirements of different metal 3D printing technologies on particle size of the Ti-6Mo-5V-3Al-2Fe-2Zr titanium alloy spherical powder; a selective laser smelting technology: performing a vibration screening on the Ti-6Mo-5V-3Al-2Fe-2Zr titanium alloy spherical powder to obtain the Ti-6Mo-5V-3Al-2Fe-2Zr titanium alloy spherical powder with the particle size of 15-53 μm and performing a vacuum molding; and a Plasma beam technology: performing a vibration screening on the Ti-6Mo-5V-3Al-2Fe-2Zr titanium alloy spherical powder to obtain the Ti-6Mo-5V-3Al-2Fe-2Zr titanium alloy spherical powder with the particle size of 53-100 μm and performing a vacuum molding.

The topography image of the Ti-6Mo-5V-3Al-2Fe-2Zr titanium alloy spherical powder prepared in Embodiment 6 is shown as FIG. 5, and the Ti-6Mo-5V-3Al-2Fe-2Zr titanium alloy spherical powder has the following advantages: (1) good sphericity; (2) an increment of oxygen (O) and nitrogen (N) elements of the Ti-6Mo-5V-3Al-2Fe-2Zr titanium alloy spherical powder is less than 0.032% (320 ppm); (3) an element composition is stable; (4) no alloy element fire waste occurs; (5) D90 is 51.2 μm, and D90 means 90% of the total particles are smaller than this size; (6) a loose density of the Ti-6Mo-5V-3Al-2Fe-2Zr titanium alloy spherical powder is 3.91 g·cm−3; (7) an average sphericity is greater than or equal to 90%; (8) a fluidity of the Ti-6Mo-5V-3Al-2Fe-2Zr titanium alloy spherical powder is good and smaller than or equal to 42 s/50 g; and (9) a yield of the powder with the particle size of 15-53 μm is 32%. Therefore, the requirements of 3D printing can be met by the Ti-6Mo-5V-3Al-2Fe-2Zr titanium alloy spherical powder.

Embodiment 6

A multi-stage gas atomization preparation method of Ti-5Mo-5V-6Cr-3Al titanium alloy spherical powder for a 3D printing technology comprises the following steps:

Step 1 (bar preparation and machining step): smelting a Ti-5Mo-5V-6Cr-3Al titanium alloy into a Ti-5Mo-5V-6Cr-3Al titanium alloy bar, and components of the raw materials of the Ti-5Mo-5V-6Cr-3Al titanium alloy meet the following requirements: 2.7-3.2% of aluminium (Al), 4.7-5.3% of vanadium (V), 4.7-5.2% of molybdenum (Mo), 5.7-6.2% of chromium (Cr), nitrogen (N) being smaller than or equal to 0.05%, hydrogen (H) being smaller than or equal to 0.015%, oxygen (O) being smaller than or equal to 0.20% and the balance of titanium (Ti); and the Ti-5Mo-5V-6Cr-3Al titanium alloy bar is mechanically machined into a Ti-5Mo-5V-6Cr-3Al titanium alloy electrode bar 3 with a diameter of 55 mm, a length of 510 mm and a 45-degree conical surface at one end.

Step 2 (multi-stage gas atomization powder preparation step through vacuum induction): using a vacuum gas atomization equipment as shown in FIG. 1 for operations, putting the Ti-5Mo-5V-6Cr-3Al titanium alloy electrode bar 3 into a smelting chamber 5, clamping and fixing the Ti-5Mo-5V-6Cr-3Al titanium alloy electrode bar 3 on an adding mechanism 2 to guarantee a verticality of the Ti-5Mo-5V-6Cr-3Al titanium alloy electrode bar 3, placing the Ti-5Mo-5V-6Cr-3Al titanium alloy electrode bar 3 into an induction coil 4, and making a cone angle at one end of the conical surface of the Ti-5Mo-5V-6Cr-3Al titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m3/s, then charging an inert protective gas (not shown) by the gas atomization nozzle 6; and starting a motor (not shown), and setting a rotation angle speed of the Ti-5Mo-5V-6Cr-3Al titanium alloy electrode bar 3 as 5 r/min; turning on a smelting power supply (not shown), and setting a vacuum induction heating power as 32 kW, and continuously smelting a front end tip (namely, cone angle of one end of the conical surface) of the Ti-5Mo-5V-6Cr-3Al titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the Ti-5Mo-5V-6Cr-3Al titanium alloy electrode bar 3 up and down (vertical to a bottom surface direction) to achieve a purpose of feeding the Ti-5Mo-5V-6Cr-3Al titanium alloy electrode bar 3, at a moment of the metal droplets dripping into the gas atomization chamber 7, the gas atomization nozzle 6 spray the inert protective gas, so that the metal droplets are atomized and broken, and solidified into a Ti-5Mo-5V-6Cr-3Al titanium alloy spherical powder in the gas atomization chamber 7, and the multi-stage gas atomization process is set as below: (1) the gas atomization pressure is 5.5 MPa, and the feeding speed of the Ti-5Mo-5V-6Cr-3Al titanium alloy electrode bar 3 is 0.6 mm/s; (2) the gas atomization pressure is 5.5 MPa, and the feeding speed of the Ti-5Mo-5V-6Cr-3Al titanium alloy electrode bar 3 is 0.6 mm/s; (3) the gas atomization pressure is 5 MPa, and the feeding speed of the Ti-5Mo-5V-6Cr-3Al titanium alloy electrode bar 3 is 0.7 mm/s; (4) the gas atomization pressure is 5 MPa, and the feeding speed of the Ti-5Mo-5V-6Cr-3Al titanium alloy electrode bar 3 is 0.8 mm/s; (5) the gas atomization pressure is 4.5 MPa, and the feeding speed of the Ti-5Mo-5V-6Cr-3Al titanium alloy electrode bar 3 is 0.9 mm/s; and (6) the gas atomization pressure is 4.5 MPa, and the feeding speed of the Ti-5Mo-5V-6Cr-3Al titanium alloy electrode bar 3 is 1.0 mm/s; wherein time for each of the multi-stage gas atomization processes (1) to (6) is 10 seconds; and wherein the number of cycles of the multi-stage gas atomization processes (1) to (6) is 10; and after being cooled by a cooling water system (not shown), the Ti-5Mo-5V-6Cr-3Al titanium alloy spherical powder is transported into a cyclone separator 9 through a powder conveying pipeline, and finally, reaches a powder collection tank 10 to obtain the Ti-5Mo-5V-6Cr-3Al titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the Ti-5Mo-5V-6Cr-3Al titanium alloy spherical powder prepared in the step 2 is cooled, performing a vibration screening according to the requirements of different metal 3D printing technologies on particle size of the Ti-5Mo-5V-6Cr-3Al titanium alloy spherical powder; a selective laser smelting technology: performing a vibration screening on the Ti-5Mo-5V-6Cr-3Al titanium alloy spherical powder to obtain the Ti-5Mo-5V-6Cr-3Al titanium alloy spherical powder with the particle size of 15-53 μm and performing a vacuum molding; and a Plasma beam technology: performing a vibration screening on the Ti-5Mo-5V-6Cr-3Al titanium alloy spherical powder to obtain the Ti-5Mo-5V-6Cr-3Al titanium alloy spherical powder with the particle size of 53-100 μm and performing a vacuum molding.

Figure 7:
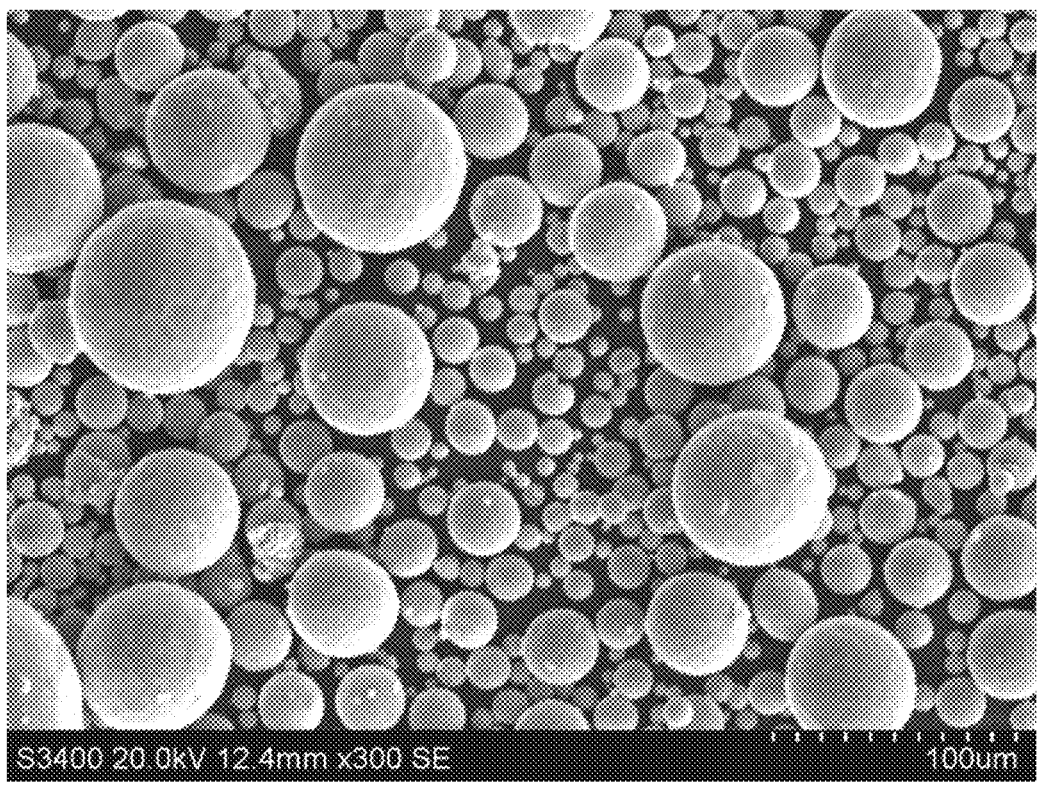
FIG. 7 shows the topography image of Ti-5Mo-5V-6Cr-3Al titanium alloy spherical powder prepared in embodiment 6.

The topography image of the Ti-5Mo-5V-6Cr-3Al titanium alloy spherical powder prepared in Embodiment 6 is shown as FIG. 7, and the Ti-5Mo-5V-6Cr-3Al titanium alloy spherical powder has the following advantages: (1) good sphericity; (2) an increment of oxygen (O) and nitrogen (N) elements of the Ti-5Mo-5V-6Cr-3Al titanium alloy spherical powder is less than 0.032% (320 ppm); (3) an element composition is stable; (4) no alloy element fire waste occurs; (5) D90 is 57.9 μm, and D90 means 90% of the total particles are smaller than this size; (6) a loose density of the Ti-5Mo-5V-6Cr-3Al titanium alloy spherical powder is 3.32 g·cm−3; (7) an average sphericity is greater than or equal to 90%; (8) a fluidity of the Ti-5Mo-5V-6Cr-3Al titanium alloy spherical powder is good and smaller than or equal to 40 s/50 g; and (9) a yield of the Ti-5Mo-5V-6Cr-3Al titanium alloy spherical powder with the particle size of 15-53 μm is 30%.

Therefore, the requirements of 3D printing can be met by the Ti-5Mo-5V-6Cr-3Al titanium alloy spherical powder.

Embodiment 7

A multi-stage gas atomization preparation method of TC11 titanium alloy spherical powder for a 3D printing technology comprises the following steps:

Step 1 (bar preparation and machining step): smelting a TC11 titanium alloy into a TC11 titanium alloy bar, and components of the raw materials of the TC11 titanium alloy meet the following requirements: 5.8-7.0% of aluminium (Al), 2.8-3.8% of molybdenum (Mo), 0.8-2.0% of zirconium (Zr), 0.2-0.35% of silicon (Si), iron (Fe) being smaller than or equal to 0.25%, oxygen (O) being smaller than or equal to 0.09%, nitrogen (N) being smaller than or equal to 0.05%, and the balance of titanium (Ti); and the TC11 titanium alloy bar is mechanically machined into a TC11 titanium alloy electrode bar 3 with a diameter of 55 mm, a length of 590 mm and a 45-degree conical surface at one end.

Step 2 (multi-stage gas atomization powder preparation step through vacuum induction): using a vacuum gas atomization equipment as shown in FIG. 1 for operations, putting the TC11 titanium alloy electrode bar 3 into a smelting chamber 5, clamping and fixing the TC11 titanium alloy electrode bar 3 on an adding mechanism 2 to guarantee a verticality of the TC11 titanium alloy electrode bar 3, placing the TC11 titanium alloy electrode bar 3 into an induction coil 4, and making a cone angle at one end of the conical surface of the TC11 titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m3/s, then charging an inert protective gas (not shown) by the gas atomization nozzle 6; starting a motor (not shown), and setting a rotation angle speed of the TC11 titanium alloy electrode bar 3 as 5 r/min; turning on a smelting power supply (not shown), and setting a vacuum induction heating power as 30 kW, and continuously smelting a front end tip (namely, cone angle of one end of the conical surface) of the TC11 titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the TC11 titanium alloy electrode bar 3 up and down (vertical to a bottom surface direction) to achieve a purpose of feeding the TC11 titanium alloy electrode bar 3, at a moment of the metal droplets dripping into the gas atomization chamber 7, the gas atomization nozzle 6 spray the inert protective gas, so that the metal droplets are atomized and broken, and solidified into a TC11 titanium alloy spherical powder in the gas atomization chamber 7, and the multi-stage gas atomization process is set in sequence as below: (1) the gas atomization pressure is 6 MPa, and the feeding speed of the TC11 titanium alloy electrode bar 3 is 0.5 mm/s; (2) the gas atomization pressure is 5.5 MPa, and the feeding speed of the TC11 titanium alloy electrode bar 3 is 0.6 mm/s; (3) the gas atomization pressure is 5.5 MPa, and the feeding speed of the TC11 titanium alloy electrode bar 3 is 0.7 mm/s; (4) the gas atomization pressure is 5.5 MPa, and the feeding speed of the TC11 titanium alloy electrode bar 3 is 0.8 mm/s; (5) the gas atomization pressure is 5.5 MPa, and the feeding speed of the TC11 titanium alloy electrode bar 3 is 0.9 mm/s; and (6) the gas atomization pressure is 5 MPa, and the feeding speed of the TC11 titanium alloy electrode bar 3 is 1.0 mm/s; wherein time for each of the multi-stage gas atomization processes (1) to (6) is 10 seconds; and wherein the number of cycles of the multi-stage gas atomization processes (1) to (6) is 12; and after being cooled by a cooling water system (not shown), the TC11 titanium alloy spherical powder is transported into a cyclone separator 9 through a powder conveying pipeline, and finally, reaches a powder collection tank 10 to obtain the TC11 titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the TC11 titanium alloy spherical powder prepared in the step 2 is cooled, performing a vibration screening according to the requirements of different metal 3D printing technologies on particle size of the TC11 titanium alloy spherical powder; a selective laser smelting technology: performing a vibration screening on the TC11 titanium alloy spherical powder to obtain the TC11 titanium alloy spherical powder with the particle size of 15-53 μm and performing a vacuum molding; and a Plasma beam technology: performing a vibration screening on the TC11 titanium alloy spherical powder to obtain the TC11 titanium alloy spherical powder with the particle size of 53-100 μm and performing a vacuum molding.

Figure 8:
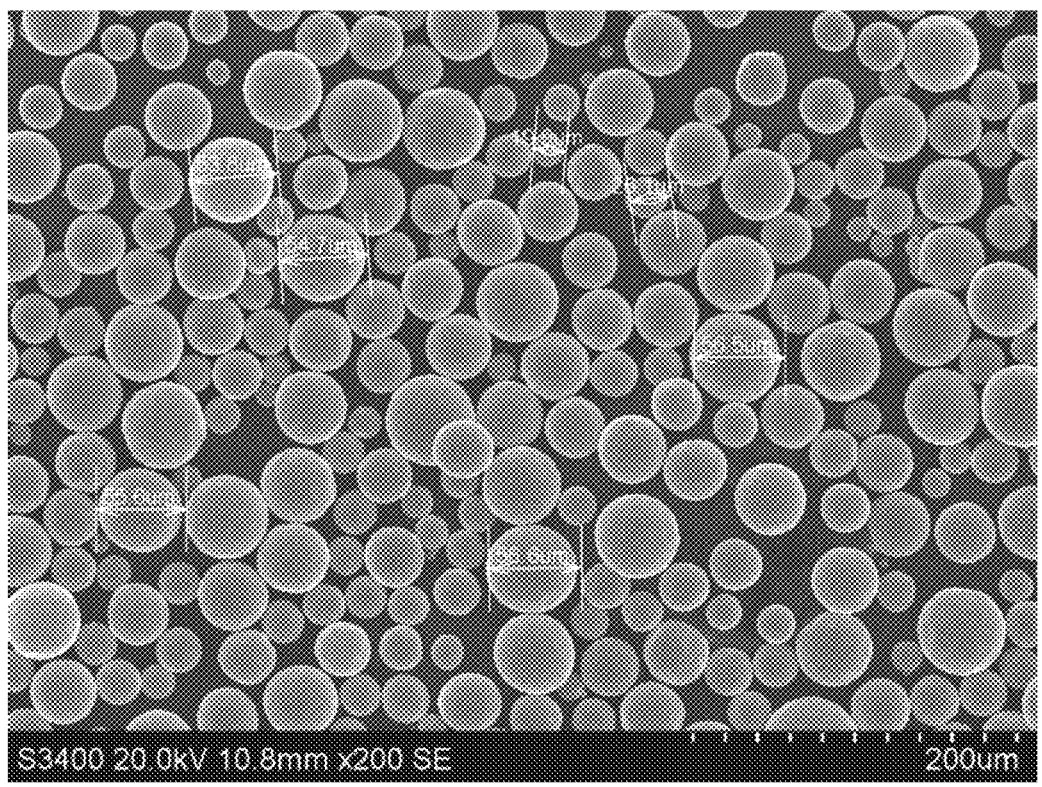
FIG. 8 shows the topography image of TC11 titanium alloy spherical powder prepared in embodiment 7.

The topography image of the TC11 titanium alloy spherical powder prepared in Embodiment 7 is shown as FIG. 8, and the TC11 titanium alloy spherical powder has the following advantages: (1) good sphericity; (2) an increment of oxygen (O) and nitrogen (N) elements of the TC11 titanium alloy spherical powder is less than 0.03% (300 ppm); (3) an element composition is stable; (4) no alloy element fire waste occurs; (5) D90 is 59.2 μm, and D90 means 90% of the total particles are smaller than this size; (6) a loose density of the TC11 titanium alloy spherical powder is 3.02 g·cm−3; (7) an average sphericity is greater than or equal to 90%; (8) a fluidity of the TC11 titanium alloy spherical powder is good and smaller than or equal to 42 s/50 g; and (9) a yield of the TC11 titanium alloy spherical powder with the particle size of 15-53 μm is 31%. Therefore, the requirements of 3D printing can be met by the TC11 titanium alloy spherical powder.

Embodiment 8

A multi-stage gas atomization preparation method of TC21 titanium alloy spherical powder for a 3D printing technology comprises the following steps:

Step 1 (bar preparation and machining step): smelting a TC21 titanium alloy into a TC21 titanium alloy bar, and components of the raw materials of the TC21 titanium alloy meet the following requirements: 5.5-6.2% of aluminium (Al), 1.9-2.1% of stannum (Sn), 1.6-2.2% of zirconium (Zr), 1.0-1.6% of chromium (Cr), 1.8-2.2% of niobium (Nb), oxygen (O) being smaller than or equal to 0.09%, nitrogen (N) being smaller than or equal to 0.05%, and the balance of titanium (Ti); and the TC21 titanium alloy bar is mechanically machined into a TC21 titanium alloy electrode bar 3 with a diameter of 55 mm, a length of 550 mm and a 45-degree conical surface at one end.

Step 2 (multi-stage gas atomization powder preparation step through vacuum induction): using a vacuum gas atomization equipment as shown in FIG. 1 for operations, putting the TC21 titanium alloy electrode bar 3 into a smelting chamber 5, clamping and fixing the TC21 titanium alloy electrode bar 3 on an adding mechanism 2 to guarantee a verticality of the TC21 titanium alloy electrode bar 3, placing the TC21 titanium alloy electrode bar 3 into an induction coil 4, and making a cone angle at one end of the conical surface of the TC21 titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m3/s, then charging an inert protective gas (not shown) by the gas atomization nozzle 6; starting a motor (not shown), and setting a rotation angle speed of the TC21 titanium alloy electrode bar 3 as 5 r/min; turning on a smelting power supply (not shown), and setting a vacuum induction heating power as 32 kW, and continuously smelting a front end tip (namely, cone angle of one end of the conical surface) of the TC21 titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the TC21 titanium alloy electrode bar 3 up and down (vertical to a bottom surface direction) to achieve a purpose of feeding the TC21 titanium alloy electrode bar 3, at a moment of the metal droplets dripping into the gas atomization chamber 7, the gas atomization nozzle 6 spray the inert protective gas, so that the metal droplets are atomized and broken, and solidified into a TC21 titanium alloy spherical powder in the gas atomization chamber 7, and the process is set in sequence as below: (1) the gas atomization pressure is 5.5 MPa, and the feeding speed of the TC21 titanium alloy electrode bar 3 is 0.5 mm/s; (2) the gas atomization pressure is 5 MPa, and the feeding speed of the TC21 titanium alloy electrode bar 3 is 0.6 mm/s; (3) the gas atomization pressure is 5 MPa, and the feeding speed of the TC21 titanium alloy electrode bar 3 is 0.7 mm/s; (4) the gas atomization pressure is 5 MPa, and the feeding speed of the TC21 titanium alloy electrode bar 3 is 0.8 mm/s; (5) the gas atomization pressure is 5 MPa, and the feeding speed of the TC21 titanium alloy electrode bar 3 is 0.9 mm/s; and (6) the gas atomization pressure is 4.5 MPa, and the feeding speed of the TC21 titanium alloy electrode bar 3 is 1.0 mm/s; wherein time for each of the multi-stage gas atomization processes (1) to (6) is 10 seconds; and wherein the number of cycles of the multi-stage gas atomization processes (1) to (6) is 11; and after being cooled by a cooling water system (not shown), the TC21 titanium alloy spherical powder is transported into a cyclone separator 9 through a powder conveying pipeline, and finally, reaches a powder collection tank 10 to obtain TC21 titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the TC21 titanium alloy spherical powder prepared in the step 2 is cooled, performing a vibration screening according to the requirements of different metal 3D printing technologies on particle size of the TC21 titanium alloy spherical powder; a selective laser smelting technology: performing a vibration screening on the TC21 titanium alloy spherical powder to obtain the TC21 titanium alloy spherical powder with the particle size of 15-53 μm and performing a vacuum molding; and a Plasma beam technology: performing a vibration screening on the TC21 titanium alloy spherical powder to obtain the TC21 titanium alloy spherical powder with the particle size of 53-100 μm and performing a vacuum molding.

Figure 9:
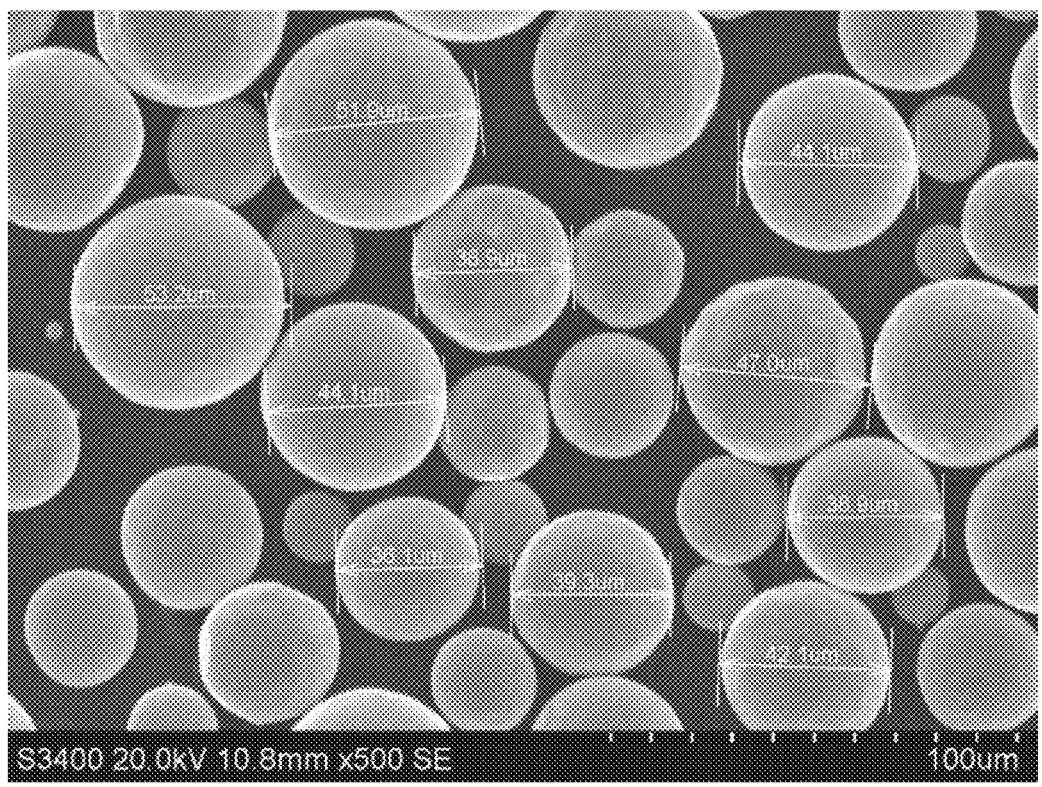
FIG. 9 shows the topography image of TC21 titanium alloy spherical powder prepared in embodiment 8.

The topography image of the TC21 titanium alloy spherical powder prepared in Embodiment 8 is shown as FIG. 9, and the TC21 titanium alloy spherical powder has the following advantages: (1) good sphericity; (2) an increment of oxygen (O) and nitrogen (N) elements of the TC21 titanium alloy spherical powder is less than 0.03% (300 ppm); (3) an element composition is stable; (4) no alloy element fire waste occurs; (5) D90 is 63.2 μm, and D90 means 90% of the total particles are smaller than this size; (6) a loose density of the TC21 titanium alloy spherical powder is 3.42 g·cm−3; (7) an average sphericity is greater than or equal to 90%; (8) a fluidity of the TC21 titanium alloy spherical powder is good and smaller than or equal to 40 s/50 g; and (9) a yield of the TC21 titanium alloy spherical powder with the particle size of 15-53[mu]m is 29%. Therefore, the requirements of 3D printing can be met by the TC21 titanium alloy spherical powder.

Embodiment 9

A multi-stage gas atomization preparation method of TC4 titanium alloy spherical powder for a 3D printing technology comprises the following steps:

Step 1 (bar preparation and machining step): smelting a TC4 titanium alloy into a TC21 titanium alloy bar, and components of the raw materials of the TC4 titanium alloy meet the following requirements: 5.5-6.8% of aluminium (Al), 3.5-4.5% of vanadium (V), iron (Fe) being smaller than or equal to 0.30%, carbon (C) being smaller than or equal to 0.10%, nitrogen (N) being smaller than or equal to 0.05%, hydrogen (H) being smaller than or equal to 0.015%, oxygen (O) being smaller than or equal to 0.20%, and the balance of titanium (Ti); and the TC4 titanium alloy bar is mechanically machined into a TC4 titanium alloy electrode bar 3 with a diameter of 55 mm, a length of 500 mm and a 45-degree conical surface at one end.

Step 2 (multi-stage gas atomization powder preparation step through vacuum induction): using a vacuum gas atomization equipment as shown in FIG. 1 for operations, putting the TC4 titanium alloy electrode bar 3 into a smelting chamber 5, clamping and fixing the TC4 titanium alloy electrode bar 3 on an adding mechanism 2 to guarantee a verticality of the TC4 titanium alloy electrode bar 3, placing the TC4 titanium alloy electrode bar 3 into an induction coil 4, and making a cone angle at one end of the conical surface of the TC4 titanium alloy electrode bar 3 align with a center of a gas atomization nozzle 6; closing a furnace door (not shown) of the smelting chamber 5, performing an integral vacuum pumping on the gas atomization equipment to a vacuum degree of 5×10−3 Pa and a leakage and adsorption rate smaller than or equal to 5 Pa m3/s, then charging an inert protective gas (not shown) by the gas atomization nozzle 6; starting a motor (not shown), and setting a rotation angle speed of the TC4 titanium alloy electrode bar 3 as 5 r/min; turning on a smelting power supply (not shown), and setting a vacuum induction heating power as 31 kW, and continuously smelting a front end tip (namely, cone angle of one end of the conical surface) of the TC4 titanium alloy electrode bar 3 to form continuous metal droplets, wherein when the metal droplets begin to drip, a gas atomization chamber 7, a valve of a tail discharge 11 and a feeding mechanism 1 are turned on, the feeding mechanism 1 moves the TC4 titanium alloy electrode bar 3 up and down (vertical to a bottom surface direction) to achieve a purpose of feeding the TC4 titanium alloy electrode bar 3, at a moment of the metal droplets dripping into the gas atomization chamber 7, the gas atomization nozzle 6 spray the inert protective gas, so that the metal droplets are atomized and broken, and solidified into a TC4 titanium alloy spherical powder in the gas atomization chamber 7, and the multi-stage gas atomization process is set as below: (1) the gas atomization pressure is 6.5 MPa, and the feeding speed of the TC4 titanium alloy electrode bar 3 is 0.5 mm/s; (2) the gas atomization pressure is 6 MPa, and the feeding speed of the TC4 titanium alloy electrode bar 3 is 0.6 mm/s; (3) the gas atomization pressure is 6 MPa, and the feeding speed of the TC4 titanium alloy electrode bar 3 is 0.7 mm/s; (4) the gas atomization pressure is 5.5 MPa, and the feeding speed of the TC4 titanium alloy electrode bar 3 is 0.8 mm/s; (5) the gas atomization pressure is 5.5 MPa, and the feeding speed of the TC4 titanium alloy electrode bar 3 is 0.9 mm/s; and (6) the gas atomization pressure is 5 MPa, and the feeding speed of the TC4 titanium alloy electrode bar 3 is 1.0 mm/s; wherein time for each of the multi-stage gas atomization processes (1) to (6) is 10 seconds; and wherein the number of cycles of the multi-stage gas atomization processes (1) to (6) is 10; and after being cooled by a cooling water system (not shown), the TC4 titanium alloy spherical powder is transported into a cyclone separator 9 through a powder conveying pipeline, and finally, reaches a powder collection tank 10 to obtain the TC4 titanium alloy spherical powder.

Alternatively, in the gas atomization process of the step 2, monitoring a gas atomization state of the metal droplets in the gas atomization chamber 7 through an observation window 8, if the metal droplets spray upwards and return to the gas atomization nozzle 6, the gas atomization process stops immediately.

Step 3 (powder screening step): after the TC4 titanium alloy spherical powder prepared in the step 2 is cooled, performing a vibration screening according to the requirements of different metal 3D printing technologies on particle size of the TC4 titanium alloy spherical powder; a selective laser smelting technology: performing a vibration screening on the TC4 titanium alloy spherical powder to obtain the TC4 titanium alloy spherical powder with the particle size of 15-53 μm and performing a vacuum molding; and a Plasma beam technology: performing a vibration screening on the TC4 titanium alloy spherical powder to obtain the TC4 titanium alloy spherical powder with the particle size of 53-100 μm and performing a vacuum molding.

Figure 10:
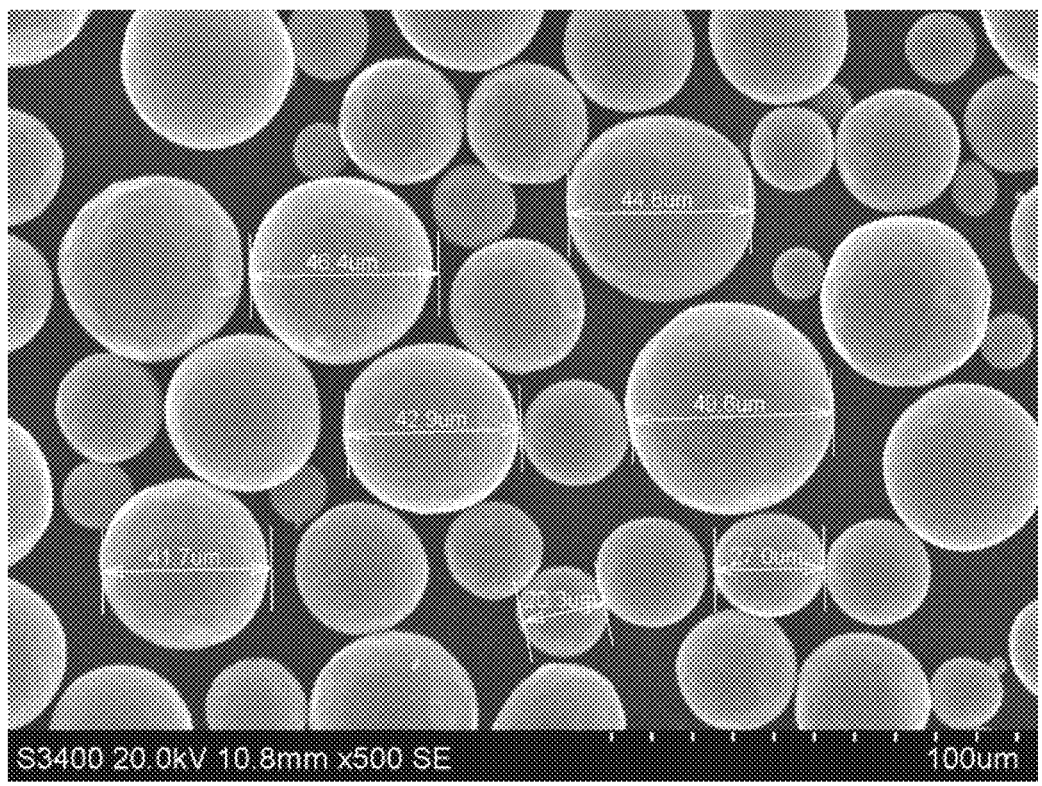
FIG. 10 shows the topography image of TC4 titanium alloy spherical powder prepared in embodiment 9.

The topography image of the TC4 titanium alloy spherical powder prepared in Embodiment 9 is shown as FIG. 10, and the TC4 titanium alloy spherical powder has the following advantages: (1) good sphericity; (2) an increment of oxygen (O) and nitrogen (N) elements of the TC4 titanium alloy spherical powder is less than 0.03% (300 ppm); (3) an element composition is stable; (4) no alloy element fire waste occurs; (5) D90 is 54.7 μm, and D90 means 90% of the total particles are smaller than this size; (6) a loose density of the TC4 titanium alloy spherical powder is 3.72 g·cm−3; (7) an average sphericity is greater than or equal to 90%; (8) a fluidity of the TC4 titanium alloy spherical powder is good and smaller than or equal to 43 s/50 g; and (9) a yield of the TC4 titanium alloy spherical powder with the particle size of 15-53 μm is 33%. Therefore, the requirements of 3D printing can be met by the TC4 titanium alloy spherical powder.

What is claimed is:

1. A multi-stage gas atomization preparation method of titanium alloy spherical powder for a 3D printing technology, comprising the following steps:

step 1 (bar preparation and machining step): smelting a titanium alloy into a titanium alloy bar; and performing a mechanical machining to machine one end of the titanium alloy bar into a conical surface to prepare a titanium alloy electrode bar;

step 2 (multi-stage gas atomization powder preparation step through vacuum induction): using a gas atomization equipment for operations, putting the titanium alloy electrode bar into a smelting chamber, clamping and fixing the titanium alloy electrode bar on an adding mechanism, placing the titanium alloy electrode bar into an induction coil, and making a cone angle at one end of the conical surface of the titanium alloy electrode bar align with a center of a gas atomization nozzle; closing a furnace door of the smelting chamber, performing an integral vacuum pumping on the gas atomization equipment, then charging an inert protective gas by the gas atomization nozzle; starting a motor, and controlling a rotation angle speed and a feeding speed of the titanium alloy electrode bar; turning on a smelting power supply, and continuously smelting a front end tip of the titanium alloy electrode bar to form continuous metal droplets, wherein a liquid flow of the metal droplets vertically falls into the center of the gas atomization nozzle; adjusting a gas atomization pressure, and achieving a multi-stage flexible control of inert gas, wherein a multi-stage gas atomization process is used for flexible control, when the metal droplets begin to drip, a gas atomization chamber, a valve of a tail discharge and a feeding mechanism are turned on, the feeding mechanism moves the titanium alloy electrode bar up and down, at a moment of the metal droplets dripping into the gas atomization chamber, the gas atomization nozzle spray the inert protective gas, so that the metal droplets are atomized and broken, and solidified into a titanium alloy spherical powder in the gas atomization chamber; wherein the multi-stage gas atomization process is set in sequence as below: (1) the gas atomization pressure is 5.5-6.5 MPa, and the feeding speed of the titanium alloy electrode bar is 0.4-0.6 mm/s; (2) the gas atomization pressure is 5-6 MPa, and the feeding speed of the titanium alloy electrode bar is 0.5-0.6 mm/s; (3) the gas atomization pressure is 5-6 MPa, and the feeding speed of the titanium alloy electrode bar is 0.6-0.7 mm/s; (4) the gas atomization pressure is 5-5.5 MPa, and the feeding speed of the titanium alloy electrode bar is 0.7-0.8 mm/s; (5) the gas atomization pressure is 5-5.5 MPa, and the feeding speed of the titanium alloy electrode bar is 0.8-0.9 mm/s; and (6) the gas atomization pressure is 4.5-5.5 MPa, and the feeding speed of the titanium alloy electrode bar is 0.9-1.0 mm/s; wherein time for each of the multi-stage gas atomization processes (1) to (6) is 10 seconds and the number of cycles of the multi-stage gas atomization processes (1) to (6) is 9-12; and after being cooled by a cooling water system, the titanium alloy spherical powder is transported into a cyclone separator through a powder conveying pipeline, and finally, reaches a powder collection tank to obtain the titanium alloy spherical powder; and step 3 (powder screening step): after the titanium alloy spherical powder prepared in the step 2 is cooled, performing a vibration screening according to requirements of different metal 3D printing technologies on particle size of the powder to obtain titanium alloy spherical powder for the different metal 3D printing technologies, and then performing a vacuum pumping molding for storage.

2. The method according to claim 1, wherein the titanium alloy bar in the step 1 is mechanically machined into the titanium alloy electrode bar with a diameter of 50-60 mm, a length of 450-590 mm and a 45-degree conical surface at one end.

3. The method according to claim 1, wherein during performing the integral vacuum pumping on the gas atomization equipment in the step 2, the gas atomization equipment has a vacuum degree of $5 \times 10^{-3}$ Pa, and a leakage and adsorption rate smaller than or equal to 5 Pa m$^3$/s.

4. The method according to claim 1, wherein in the step 2, the motor is started, the rotation angle speed of the titanium alloy electrode bar is set as 4-6 r/min, and the feeding speed of the titanium alloy electrode bar is set as 0.4-1.0 mm/s.

5. The method according to claim 1, wherein in the step 2, a vacuum induction heating power of the front end tip of the titanium alloy electrode bar is between 27-35 kW, and is adjusted according to a smelting condition of the titanium alloy electrode bar.

6. The method according to claim 1, wherein an increment of oxygen (O) and nitrogen (N) elements of the titanium alloy spherical powder is less than 0.035% (350 ppm).

7. The method according to claim 1, wherein the titanium alloy spherical powder prepared in the step 3 for the 3D printing technology is TA15 titanium alloy spherical powder, TA7 titanium alloy spherical powder, TA17 titanium alloy spherical powder, TC4 titanium alloy spherical powder, TC11 titanium alloy spherical powder, TC21 titanium alloy spherical powder, Ti-10V-2Fe-3Al titanium alloy spherical powder, Ti-6Mo-5V-3Al-2Fe-2Zr titanium alloy spherical powder or Ti-5Mo-5V-6Cr-3Al titanium alloy spherical powder.

* * * * *